(12) United States Patent
Kirby

(10) Patent No.: US 8,336,316 B2
(45) Date of Patent: Dec. 25, 2012

(54) NOISE REDUCTION DEVICE

(75) Inventor: Stuart J. Kirby, Derby (GB)

(73) Assignee: Rolls-Royce PLC, London (GB)

( * ) Notice: Subject to any disclaimer, the term of this patent is extended or adjusted under 35 U.S.C. 154(b) by 564 days.

(21) Appl. No.: 12/585,197

(22) Filed: Sep. 8, 2009

(65) Prior Publication Data

US 2010/0115964 A1    May 13, 2010

(30) Foreign Application Priority Data

Nov. 11, 2008  (GB) .................................. 0820597.3

(51) Int. Cl.
F02C 6/04 (2006.01)

(52) U.S. Cl. .......................................... 60/785; 60/725

(58) Field of Classification Search .................. 60/226.1, 60/725, 782–785, 795; 181/210, 248, 252, 181/258, 279
See application file for complete search history.

(56) References Cited

U.S. PATENT DOCUMENTS

| | | | | |
|---|---|---|---|---|
| 3,232,374 A | * | 2/1966 | Powers ......................... | 181/245 |
| 3,948,346 A | * | 4/1976 | Schindler ..................... | 181/286 |
| 5,183,976 A | * | 2/1993 | Plemons, Jr. ................. | 181/264 |
| 5,687,562 A | * | 11/1997 | Stewart et al. ............... | 60/226.3 |
| 5,899,058 A | * | 5/1999 | Narcus et al. ................ | 60/226.3 |
| 6,241,044 B1 | * | 6/2001 | Nishiyama et al. .......... | 181/272 |
| 6,343,672 B1 | * | 2/2002 | Petela et al. ................. | 181/224 |
| 7,401,682 B2 | * | 7/2008 | Proscia et al. ............... | 181/290 |
| 7,413,053 B2 | * | 8/2008 | Wasif et al. .................. | 181/293 |
| 7,946,104 B2 | * | 5/2011 | Frank et al. .................. | 60/226.1 |
| 8,001,789 B2 | * | 8/2011 | Vega et al. .................... | 60/785 |
| 2001/0042368 A1 | | 11/2001 | Negulescu | |
| 2005/0284690 A1 | * | 12/2005 | Proscia et al. ............... | 181/214 |
| 2006/0273203 A1 | * | 12/2006 | Denzler ..................... | 239/428.5 |

FOREIGN PATENT DOCUMENTS

| | | |
|---|---|---|
| DE | 44 12 517 A1 | 10/1995 |
| GB | 1137321 | 12/1968 |
| GB | 2 132 269 A | 7/1984 |
| GB | 2 405 666 A | 3/2005 |
| JP | A 11-173644 | 7/1999 |
| SU | 1126691 A | 11/1984 |

* cited by examiner

Primary Examiner — Phutthiwat Wongwian
(74) Attorney, Agent, or Firm — Oliff & Berridge, PLC.

(57) ABSTRACT

A noise reduction device, for example for use in a bleed assembly of a gas turbine engine, comprises partitions having apertures which provide contractions and sudden expansions of flow passing through the device, turbulators being provided between the partitions to break up jets issuing from the Apertures. Breaking up the jets before impact with the partitions enables the partitions to be disposed closer together, so enabling adequate noise reduction to be achieved in a device of relatively small thickness.

15 Claims, 4 Drawing Sheets

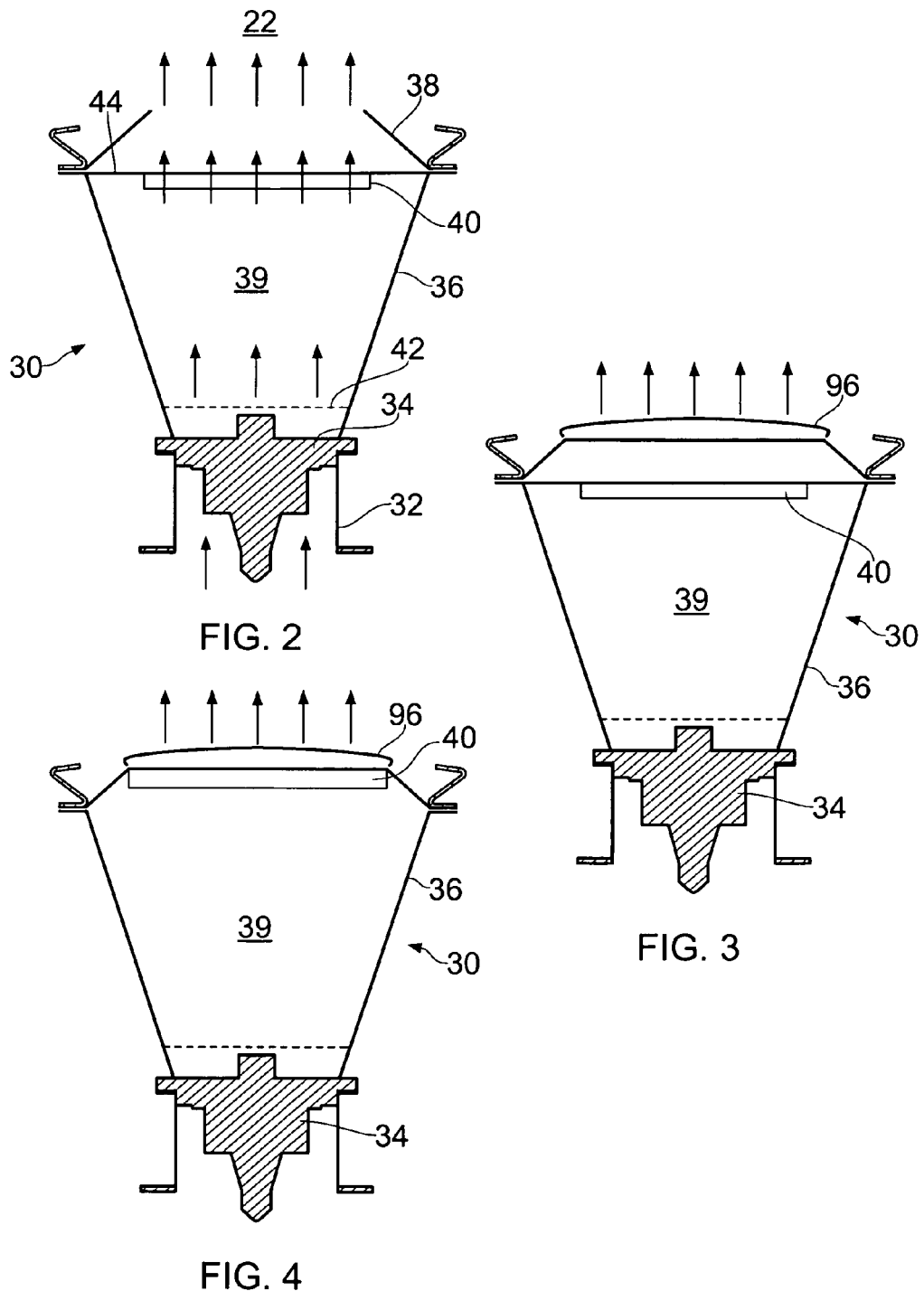

NOISE REDUCTION DEVICE

TECHNICAL FIELD

This invention relates to a noise reduction device, and is particularly, although not exclusively, concerned with such a device for use with a bleed valve in a gas turbine engine to release compressed air from a compressor stage to a bypass duct of the engine.

BACKGROUND

When a gas turbine engine is operating under transient conditions, for example when decelerating, it may be necessary to bleed air at high pressure from the core gas flow through the engine. Such air may be transferred to a bypass flow within the engine. Bleed valves are provided to control this transfer of air. The flow of bleed air from the core gas flow into the bypass flow takes place over a substantial pressure drop, and can generate significant noise. It is therefore usual to provide a noise reduction device in, or at the exit of, the flow passage between the core gas flow and the bypass duct. A typical measure is to discharge the bleed air into the bypass duct through a perforated plate, sometimes referred to as a "pepper pot" as disclosed, for example, in US2001/0042368. The pepper pot serves to break the single body of air flowing towards the bypass duct into a large number of smaller jets which promote small-scale turbulence and hence quicker mixing with the main flow through the bypass duct.

SUMMARY OF THE INVENTION

In order to avoid a single large pressure drop and sudden expansion from the high pressure core flow to the bypass flow, two or more pepper pots have been used in series, in order to break the single large pressure drop into a series of smaller pressure drops. Pepper pots are typically made from thin metallic sheets in which holes are formed, for example by laser cutting, and tend to be expensive. If a series of pepper pots are used downstream of a single bleed valve, the cost is multiplied. Also, pepper pots are subjected to high transient pressure drops, and the shock loadings can cause them to deform or disintegrate.

According to the present invention there is provided a noise reduction device for a flow of gas, the device comprising a flow passage and a partition extending across the flow passage, the partition being provided with apertures which cause contraction followed by sudden expansion of flow passing through the flow passage, the partition bounding a turbulence zone of the flow passage, the turbulence zone being provided with turbulators for enhancing turbulence in gas flowing through the turbulence zone towards the partition.

The turbulators may be distributed along the flow direction in the turbulence zone, and may comprise elongate elements which extend transversely of the general flow direction in the flow passage. The turbulators may be disposed obliquely with respect to the partition.

The partition may be situated at an exit from the noise reduction device, but in an alternative embodiment, further turbulators may be provided between the partition and the exit.

In one embodiment, the turbulators may comprise diagonal struts extending between the partition, comprising a first partition, and a second partition spaced from the first partition. At least some of the turbulators may be arranged to form truss structures, each truss structure comprising a row of struts lying in a common plane extending between the first partition and the second partition, adjacent struts extending diagonally between the partitions at opposite angles of inclination. Adjacent truss structures may be arranged out of phase with each other, so that the struts of one truss structure cross a respective strut of the other truss structure.

The apertures in the partitions may be disposed in rows which lie in the common planes of the respective truss structures.

The partition, or the first partition, and the turbulators disposed in the turbulence zone bounded by the partition, or by the first partition, may constitute a noise reduction stage, the device comprising at least one further noise reduction stage comprising a further partition bounding a further turbulence zone provided with further turbulators. The stages may comprise a pre-formed unit or cassette installed in the flow passage.

The total area of the apertures in one of the partitions may be greater than the total area of the apertures in another, upstream, partition. The variation in total area may be achieved by providing different numbers of apertures in the respective partitions, and/or by varying the cross-sectional areas of the apertures.

At least part of the pre-formed unit may be manufactured by a stereolithographic process, such as a selective laser sintering process or a laser direct metal deposition process. Such processes enable the manufacture of complex structures, including the or each partition and the turbulators.

The present invention also provides a bleed valve assembly for a gas turbine engine, the assembly comprising a noise reduction device as defined above, having a bleed valve at an inlet end of the flow passage. The present invention also provides a gas turbine engine having a compressor, a bypass duct, and a bleed valve assembly as defined above, the flow passage extending between the compressor and the bypass duct.

For a better understanding of the present invention, and to show more clearly how it may be carried into effect, reference will now be made, by way of example, to the accompanying drawings, in which:

BRIEF DESCRIPTION OF THE DRAWINGS

FIG. 2 is a sectional view of a bleed assembly;
FIGS. 3 and 4 correspond to FIG. 2 but show alternative embodiments of the bleed assembly.

DETAILED DESCRIPTION

Figure 1:
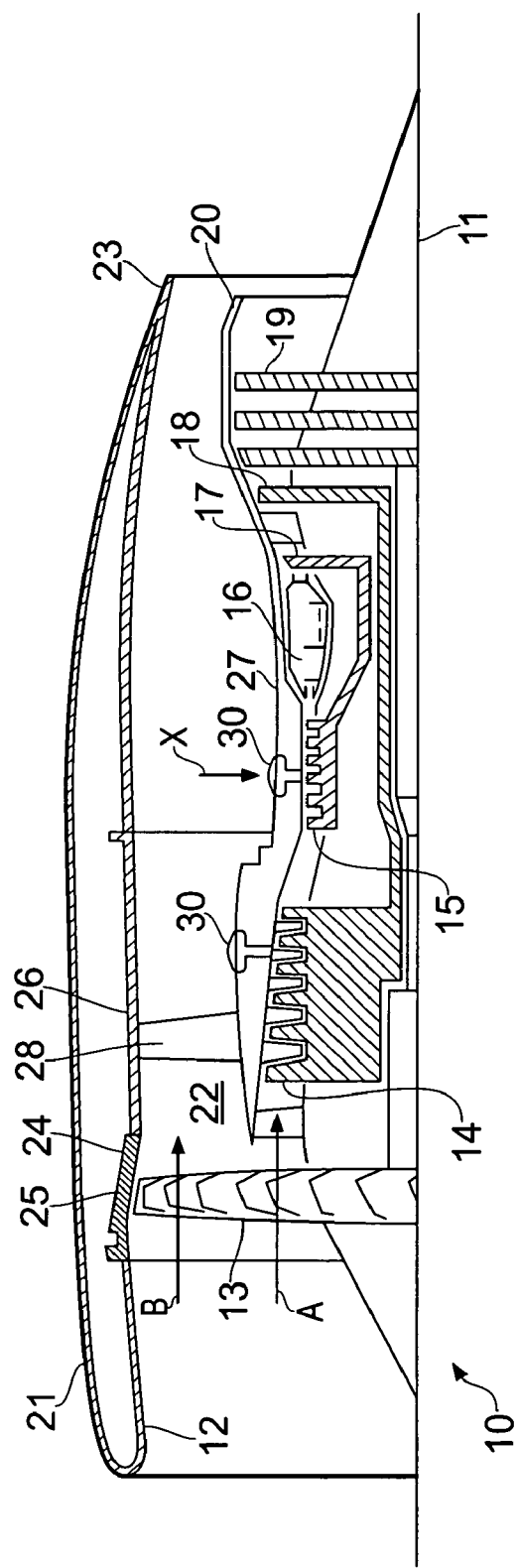
FIG. 1 is a schematic sectional view of a gas turbine engine.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached inwardly thereto is a rear fan casing 26.

During engine operations and particularly when changing rotational speed at low power it is important to ensure that the pressure ratio across each compressor 14, 15 remains below a critical working point, otherwise the engine 10 can surge and flow through the engine 10 breaks down. This can cause damage to engine's components as well as aircraft handling problems.

To maintain a preferred pressure difference across a compressor 14, 15, or even just one stage of a compressor 14, 15, bleed assemblies 30 are provided to release pressure from an upstream part of a compressor 14, 15. Operation of a bleed assembly 30 and engine operability are described in "The Jet Engine" 6th Edition, 2005, Rolls-Royce plc, pages 79-80, and details of such operation will therefore only be briefly mentioned herein.

FIG. 2 shows one of the bleed assemblies 30. Each bleed assembly 30 comprises an inlet 32, a bleed valve 34, a duct 36 and an outlet 38. A noise reduction device 40 is situated at the junction between the duct 36 and the outlet 38. The duct 36 and the outlet 38 together define a flow passage 39. Parts of core engine airflow A may be diverted through the bleed assembly 30 by opening the bleed valve 34, such that the bleed airflow enters the inlet 32, passes through the bleed valve 34 and is channelled the flow passage 39 defined by the duct 36 and the outlet 38 into the bypass flow B in the bypass duct 22. There is usually an annular array of bleed valves around the core engine's casing 27.

When the bleed valve 34 is open, one or more high velocity jets of air from the compressor 14 or 15 travel through the bleed duct 36. If these jets of air are discharged directly into the bypass duct 22, the resulting energy transfer between the bleed air and bypass flow B and the turbulence that is created in the bypass flow B, generates substantial noise. In order to avoid this, the noise reducing device 40 is provided.

In the embodiment shown in FIG. 2, a baffle 42 is provided at the exit from the bleed valve 34. In an alternative embodiment a baffle plate 42 is not provided. The noise reducing device 40 is in the form of a monolithic component, or cassette, which is supported at the junction between the bleed duct 36 and outlet 38 on a partition 44.

Figure 5:
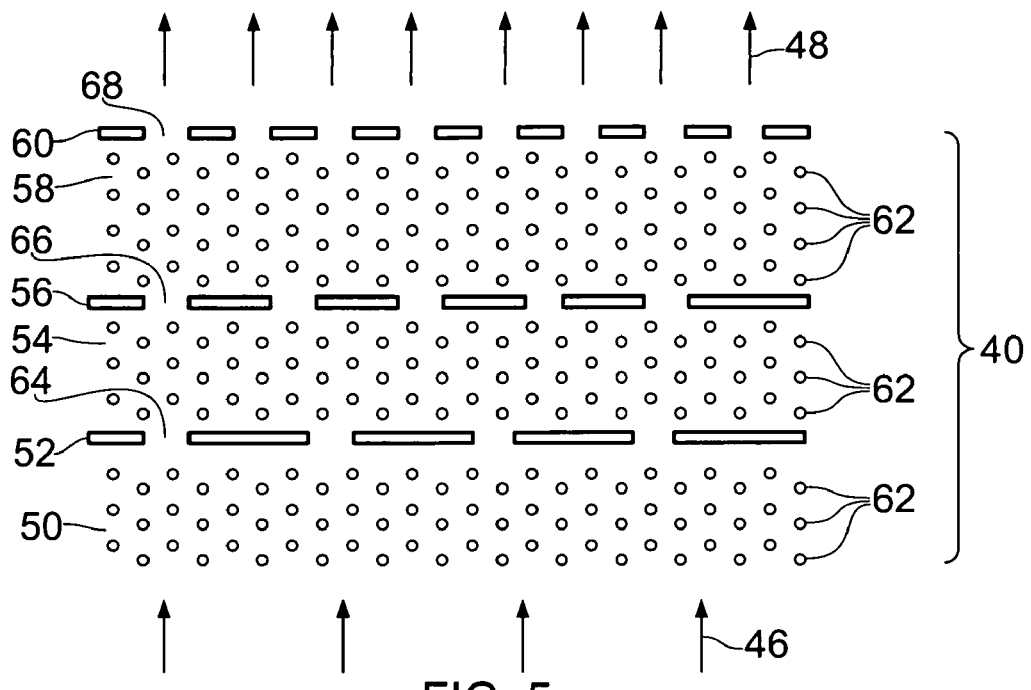
FIG. 5 is a diagrammatic view of a noise reduction device of the bleed assemblies of FIGS. 2 to 4.
Figure 6:
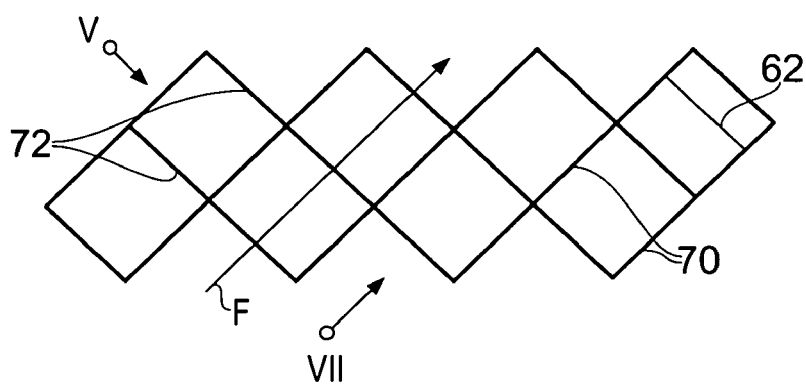
FIG. 6 is an alternative view of part of the structure of FIG. 5.
Figure 7:
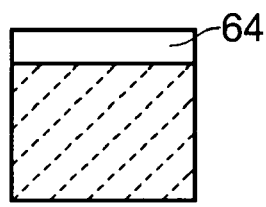
FIG. 7 is a view in the direction of the arrow VII in FIG. 6.
Figure 8:
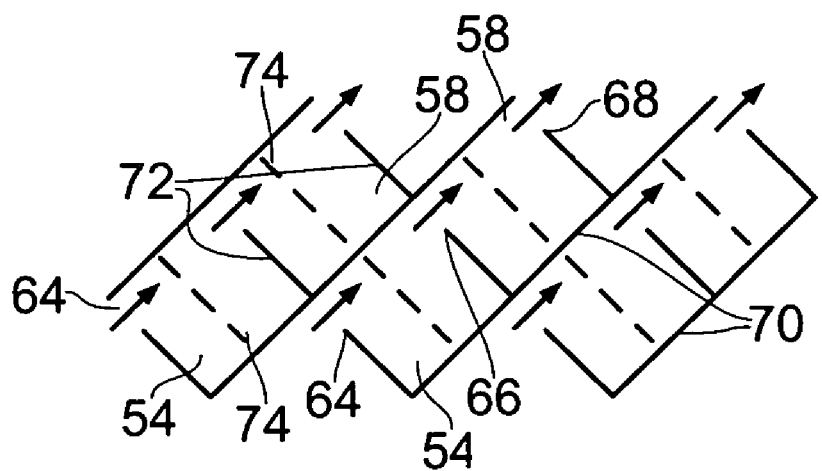
FIG. 8 is a diagrammatic representation of a variant of the structure shown in FIG. 6.

The internal structure of the device 40 is illustrated in FIGS. 5 to 7. As shown in FIG. 5, inward flow from the bleed valve 34 (or baffle 42) is indicated by arrows 46, and outlet flow into the bypass chamber 22 is indicated by arrows 48. As the flow progresses through the device 40, it encounters, in sequence, a first turbulence zone 50, a first apertured partition 52, a second turbulence zone 54, a second apertured partition 56, a third turbulence zone 58 and a third apertured partition 60. The successive sets of partitions 52, 56, 60 and the associated turbulence zones 50, 54, 58 can be regarded as individual noise reduction stages of the noise reduction device, the device shown in FIG. 5 thus having three stages.

Each of the turbulence zones 50, 54, 58 is provided with a respective array of turbulators 62, one of which is shown, for illustrative purposes, in FIG. 6. The turbulators 62 of the first turbulence zone 50 serve to break up the jet or jets of bleed air issuing from the bleed valve 34. Thus, the kinetic energy of the flow is converted into heat. The flow then passes through apertures 64 in the partition 52, from which it issues as a further series of jets which are, in turn, broken up by the turbulators 62 of the second turbulence zone 54 before reaching the second partition 56. The process is then repeated through the partition 56, the turbulence zone 58 and the partition 60.

At each partition 52, 56 and 60, the respective apertures 64, 66, 68 act as contractions in the flow, followed by sudden expansions, causing successive pressure drops across the partitions 52, 56, 60. As the pressure reduces through the device, the volume of the bleed gas expands, and consequently the successive partitions 52, 56, 60 have an increased total flow cross-section which is achieved either by increasing the size of each aperture 66, 68 or by increasing the number of apertures 66, 68, or both, by comparison with the upstream apertures 64.

FIG. 6 represents the structure between the partitions 56 and 60 of FIG. 5. FIG. 5 can be regarded as a sectional view in the direction of the arrow V in FIG. 6.

The internal structure comprises an array of walls 70, 72 which intersect one another at right angles. The walls 72 correspond to the partitions 52, 56, 60 in FIG. 5, and are provided with the apertures 64, 66, 68, one of which is indicated in FIG. 7, as a slot extending over the full width of a wall 72 between adjacent intersections with walls 70.

An arrow F indicates the direction of flow through the structure. It will be appreciated that each section of wall may have the aperture (slot) 64, 66, 68 at different positions, and consequently flow in the direction F through the aperture 64 in one wall 72 will need to deflect in order to reach the aperture 66 in the next wall 72. Also, it will be appreciated that the turbulators 62 extend across each cell formed by the walls 70, 72, as indicated in FIG. 6 by a single turbulator pin 62. It will be appreciated that each cell has a plurality of such pins, as indicated in FIG. 5. Consequently, as described above, the flow undergoes a series of contractions at the apertures (slots) 64, 66, 68, followed by sudden expansions, the resulting jet being broken up by impact with the turbulators 62.

The structure shown in FIGS. 5 and 6 may be formed by means of a stereolithographic process, such as selective laser sintering or laser direct metal deposition, sometimes referred to as Powder Bed direct laser deposition (DLD). In such methods, the structure is built up from a base plate, for example a base plate positioned at the bottom of FIG. 6, using a metal powder which is melted by a laser at locations where the structure is to be formed, but which is removed at locations which are not melted. Such processes enable complex internal structures to be formed.

In order to reduce the thickness of the cassette 40 in the general flow direction, it is desirable to form the internal structure, including the apertured partitions 52, 56, 60, in such a way that the flow is accelerated in the apertures 64, 66, 68 to as high a velocity as possible within acceptable noise limits. This usually means acceleration of the flow to high subsonic or low supersonic velocities. However, higher speeds result in greater noise generation, and consequently the number of stages (ie the number of partitions 52, 56, 60) is selected to achieve a relatively compact structure while minimising the generation of noise. By introducing the turbulators 62 between adjacent partitions 52, 56, 60, the high speed jets issuing from the apertures 64, 66, 68 are baffled efficiently, so mixing the jets in a short space, before they encounter the succeeding partitions 56, 60.

As a result of the structure disclosed in FIGS. 5 to 7, it is possible to construct a noise reduction device 40 with compact dimensions (having a thickness of the order of 10 mm), in a single structure, all or most of which may comprise a monolithic component. The structure has sufficient thickness to have good mechanical properties, including sufficient strength to resist the bending forces created by the pressure differential across the device 40. Similarly, the structure is able to withstand vibration.

The walls 70, 72 may have a maximum span between intersections of the order of 5 mm, which means they can be made relatively thin (for example around 0.3 mm) and light in weight.

The turbulators 62 are represented in FIG. 5 as pins of substantially circular cross-section, but it will be appreciated that other cross-sections, such as oval, triangular or rectangular, may be used. The turbulators 62 may have a diameter, or equivalent dimension, of approximately 0.3 mm, and the passages defined by the walls 70, 72 may have dimensions of approximately 5 mm by 15 mm, with the width of the apertures (slots) 64, 66, 68 being approximately 2 mm. As mentioned above, the number of apertures in the partitions 52, 56, 60 may be increased in the flow direction to allow for the increasing volume flow as the pressure reduces across the device 40.

Figure 9:
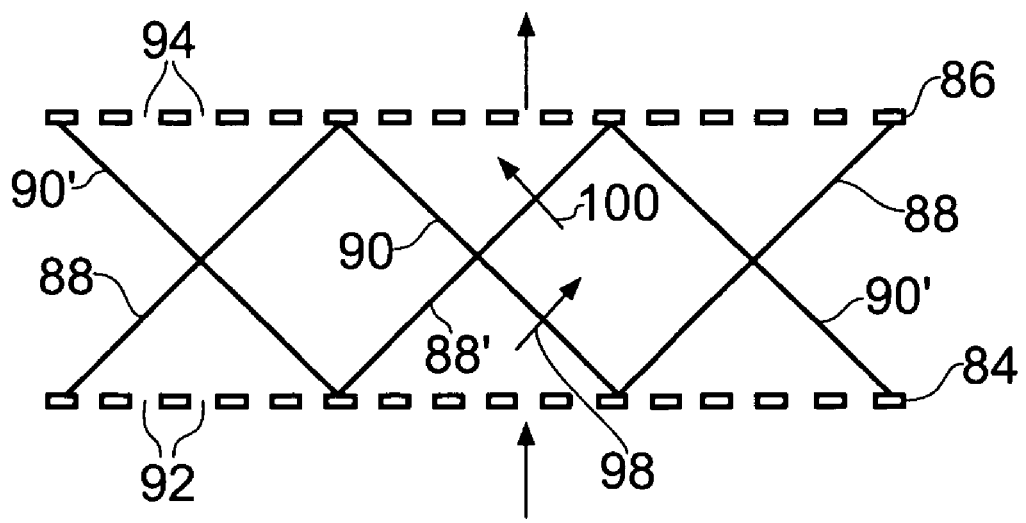
FIG. 9 shows a further alternative structure.

A further embodiment is shown in FIG. 9, in which apertured partitions 84, 86 are supported with respect to each other by truss structures each comprising struts 88, 90 arranged as alternating diagonals, in the manner of a warren truss. In FIG. 9, struts 88, 90 lie in the plane of the Figure, while struts 88' 90' extend in a plane parallel to that of the Figure and displaced out of that plane. It will be appreciated that further such truss structures 88, 90, with adjacent structures being out of phase with one another, are situated in further parallel planes. The planes may, for example, contain rows of apertures 92, 94 in the partitions 84, 86. Thus, for example, the struts 88, 90 may be aligned with one row of holes 92, 94, while the struts 88' 90' are aligned with an adjacent row of holes 92, 94.

The struts 88, 90, 88', 90', as well as supporting the partitions 84, 86 with respect to one another, constitute turbulators having the same function as the turbulators 62 in FIG. 5. Thus, flow entering the structure through the apertures 92 is forced to deviate out of the plane of the Figure on encountering the strut 90 shown in FIG. 3, as indicated by arrow 98. Subsequently, the flow must divert again, arrow 100, to pass over the strut 88' shown in the Figure before issuing from the apertures 94 in the partition 86. The struts 88, 90, 88', 90' thus serve not only to break up the jets issuing from the apertures 92, but also to force the flow to undergo a tortuous path, further causing mixing-in of the jet flows.

Although the apertures 92 in the partition 84 and the apertures 94 in the partition 86 are shown as having the same size and the same pitch as each other, this is for the sake of simplicity; as with the embodiment of FIG. 5, the downstream apertures will have a smaller pitch and/or a larger size to allow for the increasing volume flow rate in the downstream direction.

FIGS. 3 and 4 show alternative bleed assemblies 30. In the embodiment of FIG. 3, the outlet 38 is closed by a pepper pot diffuser 96, which may be of conventional form. In the embodiment of FIG. 4, the noise reducing device 40 and the pepper pot 96 are integrated into a single cassette, simplifying the manufacture of the bleed assembly, with a reduced number of components. In the embodiments of FIGS. 3 and 4, the pepper pot 96 could be replaced by a vaned outlet, or otherwise suitably configured to control the plume entering the bypass duct by directing the flow in a desired direction or pattern.

The invention claimed is:

1. A noise reduction device for a flow of gas, the noise reduction device comprising:
   a flow passage configured to receive the flow of gas from a compressor;
   a partition extending across the flow passage, the partition having apertures configured to cause contraction followed by sudden expansion of flow passing through the flow passage; and
   a turbulence zone bound by the partition, the turbulence zone having pin turbulators configured to enhance turbulence in gas flowing through the turbulence zone in a flow direction that is either towards or away from the partition.

2. The noise reduction device as claimed in claim 1, wherein the pin turbulators are distributed along the flow direction in the turbulence zone.

3. The noise reduction device as claimed in claim 2, wherein the pin turbulators extend transversely with respect to a general flow direction through the turbulence zone.

4. The noise reduction device as claimed in claim 1, wherein the pin turbulators extend obliquely with respect to the partition.

5. The noise reduction device as claimed in claim 1, wherein the partition is situated at an exit from the noise reduction device.

6. The noise reduction device as claimed in claim 1, wherein the pin turbulators comprise diagonal struts extending between the partition, and wherein the pin turbulators further comprise:
   a first partition, and
   a second partition spaced from the first partition.

7. The noise reduction device as claimed in claim 6, wherein at least two of the pin turbulators are arranged to form truss structures, each truss structure comprising a row of struts disposed in a common plane extending between the first partition and the second partition, adjacent struts extending diagonally between the partitions at opposite angles of inclination.

8. The noise reduction device as claimed in claim 7, wherein the adjacent truss structures are disposed out of phase with one another.

9. The noise reduction device as claimed in claim 7, wherein the apertures in the partitions are disposed in rows, the struts being aligned with respective rows of the apertures.

10. The noise reduction device as claimed in claim 1, wherein the partition or a first partition and the pin turbulators disposed in the turbulence zone bounded by the partition constitute a noise reduction stage, the noise reduction device comprising at least one further noise reduction stage comprising a further partition bounding a further turbulence zone provided with further pin turbulators.

11. The noise reduction device as claimed in claim 10, wherein the stages comprise a pre-formed unit installed in the flow passage.

12. The noise reduction device as claimed in claim 10, wherein a total flow cross section of the apertures varies between the partitions.

13. The noise reduction device as claimed in claim 1, wherein at least part of the noise reduction device is manufactured by a stereolithographic process.

14. A bleed assembly for a gas turbine engine, the assembly comprising:
the noise reduction device in accordance with claim 1, and
a bleed valve at an inlet end of the flow passage.

15. A gas turbine engine having the compressor, a bypass duct and a bleed assembly in accordance with claim 14, the flow passage extending between the compressor and the bypass duct.

* * * * *